United States Patent [19]
Brune et al.

[11] Patent Number: 5,184,056
[45] Date of Patent: Feb. 2, 1993

[54] METHOD OF REGULATING THE TORQUE RESPONSE OF A MULTIPHASE ELECTRONICALLY COMMUTATED ELECTRIC MOTOR

[75] Inventors: Richard Brune, Fuerth; Wolfgang Papiernik; Güenter Rochholz, both of Erlangen, all of Fed. Rep. of Germany

[73] Assignee: Siemens Aktiengesellschaft, Berlin & Munich, Fed. Rep. of Germany

[21] Appl. No.: 450,682

[22] Filed: Dec. 14, 1989

[30] Foreign Application Priority Data

Jan. 13, 1989 [EP] European Pat. Off. ........ 89100599.3

[51] Int. Cl.$^5$ ............................................. H02P 5/40
[52] U.S. Cl. ..................................... 318/799; 318/811
[58] Field of Search ............... 318/138, 254, 799–803, 318/811, 805

[56] References Cited

U.S. PATENT DOCUMENTS

| | | | |
|---|---|---|---|
| 4,272,715 | 6/1981 | Matsumoto | 318/799 |
| 4,368,411 | 1/1983 | Kidd | 318/254 |
| 4,460,860 | 7/1984 | Schwesig et al. | 318/802 |
| 4,477,762 | 10/1984 | Kurakake et al. | 318/802 |
| 4,490,661 | 7/1983 | Brown et al. | 318/254 |
| 4,558,269 | 12/1985 | Ishida et al. | 318/802 |
| 4,565,956 | 1/1986 | Zimmermann et al. | 318/721 |
| 4,686,437 | 8/1987 | Langley et al. | 318/254 |
| 4,714,878 | 12/1987 | Steinigeweg | 324/158 |

FOREIGN PATENT DOCUMENTS

| | | |
|---|---|---|
| 0065614 | 12/1982 | European Pat. Off. . |
| 0191005 | 8/1986 | European Pat. Off. . |
| 0208847 | 1/1987 | European Pat. Off. . |
| 0313929 | 5/1989 | European Pat. Off. . |

OTHER PUBLICATIONS

Mulukutla S. Sarma, Electric Machines, Steady State Theory and Dynamic Performance, 1985, pp. 247–254.

*Primary Examiner*—William M. Shoop, Jr.
*Assistant Examiner*—John W. Cabeca
*Attorney, Agent, or Firm*—Kenyon & Kenyon

[57] ABSTRACT

In the regulation of the torque response of multiphase electronically commutated electric motors, in particular synchronous motors, a constant moment of rotation response is achieved by forming the nominal current values for the phases to be regulated depending on a torque-regulating variable and the rotor position. A current regulator is assigned to each current phase to be regulated. The method makes it possible to preset a nominal current value for each phase to be regulated for any adjustable torque as a function of the particular rotor position. The separate regulation of the nominal current values ensures that the up-commutating current is alternating exactly with the down-commutating current and hence no system-caused torque transients occur.

21 Claims, 3 Drawing Sheets

METHOD OF REGULATING THE TORQUE RESPONSE OF A MULTIPHASE ELECTRONICALLY COMMUTATED ELECTRIC MOTOR

FIELD OF THE INVENTION

This invention relates to a method for regulating the torque response of a multiphase electronically commutated electric motor and more particularly to a method for regulating the torque behavior of a synchronous motor with a rotor-position sensor, in which the torque of the electric motor is controlled by an adjustable nominal current value, the particular nominal current value being derived from a torque or speed-regulating variable.

BACKGROUND OF THE INVENTION

Synchronous motors or synchronous machines are suitable for the generation of an adjustable torque response. Synchronous machines can be made to generate a constant torque by supplying them with trapezoidal electromotive forces and square wave currents. The square wave currents are generated in a power converter after preceding pulse width modulation. This pulse width modulation is aided by a pulse distribution circuit which is a function of the rotor position wherein a rotating electromagnetic field originates in the machine. Because the synchronous machine is not ideally constructed, errors occur such as gaps in the windings, slot ripple, manufacturing tolerances, etc., and, as a result, the resulting torque response deviates from the nominal torque. Additionally, because of the controlled adjusting of the current and time settings having different lengths in the up and down commutation, system-related torque transients result.

In the German Patent Application, No. P 37 36 215.5, a method is suggested for avoiding a current transient in a phase winding of a three-phase square wave synchronous machine, wherein the three phase square wave current is not part of the commutation process. The pulse width modulated pulses for the power converter of the synchronous machine are generated by a high frequency triangular scanning potential and a control potential. Through an anticipating commutation control, on the average, the current decrease in the down-commutated phase winding is equal to the average of the negative current increase in the up-commutated phase winding. This method leads to a marked improvement in the torque response. The torque transients however can only be reduced in terms of the time average and not instantaneously.

Thus, there is a need for a method that produces a constant torque response in the regulation of electric motors, particularly synchronous machines.

SUMMARY OF THE INVENTION

This and other needs are satisfied by the method of the present invention to regulate the torque response of an electric motor or synchronous machine. First, a rotor-position signal is made available for each phase to be regulated. Then, the torque-regulating variable is combined with the rotor-position signal in order to form a nominal current value for each current phase. A current-regulating variable is formed from the difference between the particular nominal current value present and the actual current value. Lastly, in each current phase an associated current regulator generates a nominal voltage corresponding to the current-regulating variable and uses the nominal voltages to control the electric motor using a pulse width modulator.

This method deviates from the regulation concepts applied up to now by allowing the presetting of a nominal current value for each desired adjustable torque value as a function of the particular rotor position for each phase to be regulated. The corresponding nominal current values for the formation of a constant torque response can be preset, not only, with a trapezoidal electromotive force, but rather for any electromotive force. Using the rotor position with the adjustable nominal current value relaxes the manufacturing tolerances of electric motors of identical construction. Separately regulating the phase currents of the electric motor ensures that the up-commutating current alternates precisely with the down-commutating current and hence no system-related transients of the torque occur.

The combining of the particular torque-regulating variable with the particular rotor-position dependent signal of a current phase can take place multiplicatively. Depending on whether or not the torque-regulating variable and/or the particular rotor position dependent signal is present in analog or digital forms, an analog multiplier, a digital multiplier or a digital-to-analog multiplier can be used.

In accordance with the invention the rotor-position dependent signals can be stored in memory and triggered by applying a signal which corresponds to the current rotor position to the inputs of the memory.

However, it is also possible to store in memory the desired nominal current values corresponding to the particular rotor position and the particular torque-regulating variable and to trigger them as a function of the particular torque-regulating variable and the particular rotor position. This can be achieved through the method according to the invention. First, the nominal current value corresponding to a particular torque-regulating variable and the particular rotor position are stored digitally in memory for each phase to be regulated. Next, the particular nominal current value for the particular phase is triggered by applying the torque-regulating variable as well as the current rotor position at the inputs of the memory. These values are then passed on to the digital input of a particular digital-to-analog converter. A current-regulating variable is formed from the difference between the particular instantaneous nominal current value and the actual current value. A current regulator assigned to each current phase generates a nominal voltage corresponding to the particular current-regulating variable. A pulse width modulator uses this nominal voltage to control the electric motor.

Since nominal current values are already present in memory, the multiplication of the torque-regulating variable and the rotor-position dependent signal becomes unnecessary. Therefore, the time expenditure necessary for multiplication is omitted and the costs for the corresponding structural parts are saved.

Further, in the regulation of a three-phase electric motor, a nominal voltage for the third phase is formed from the two other nominal voltages according to the neutral lead condition, i.e., the sum of the phase current is zero. Therefore, the memory space requirement, the number of stored nominal current values, the size of the digital-to-analog converter, and the number of required current regulators can be reduced. The method of the present invention can also be applied to the control of an electric motor with more than three phases.

A further implementation of the present invention for the regulation of a three-phase electric motor is disclosed. In this implementation, the third current-regulating value is formed from the instantaneous analog nominal current values present and from the actual current values according to the neutral lead condition. If the nominal current values for the two phases are so selected, for example, to prevent damage to the transistors, that the neutral lead condition for the three line currents is not maintained, all three currents can be separately regulated. If the formation of a nominal current value from the preset nominal current values takes into consideration the corresponding regulating devices, regulation of multiphase electric motors is possible.

DETAILED DESCRIPTION

Figure 1:
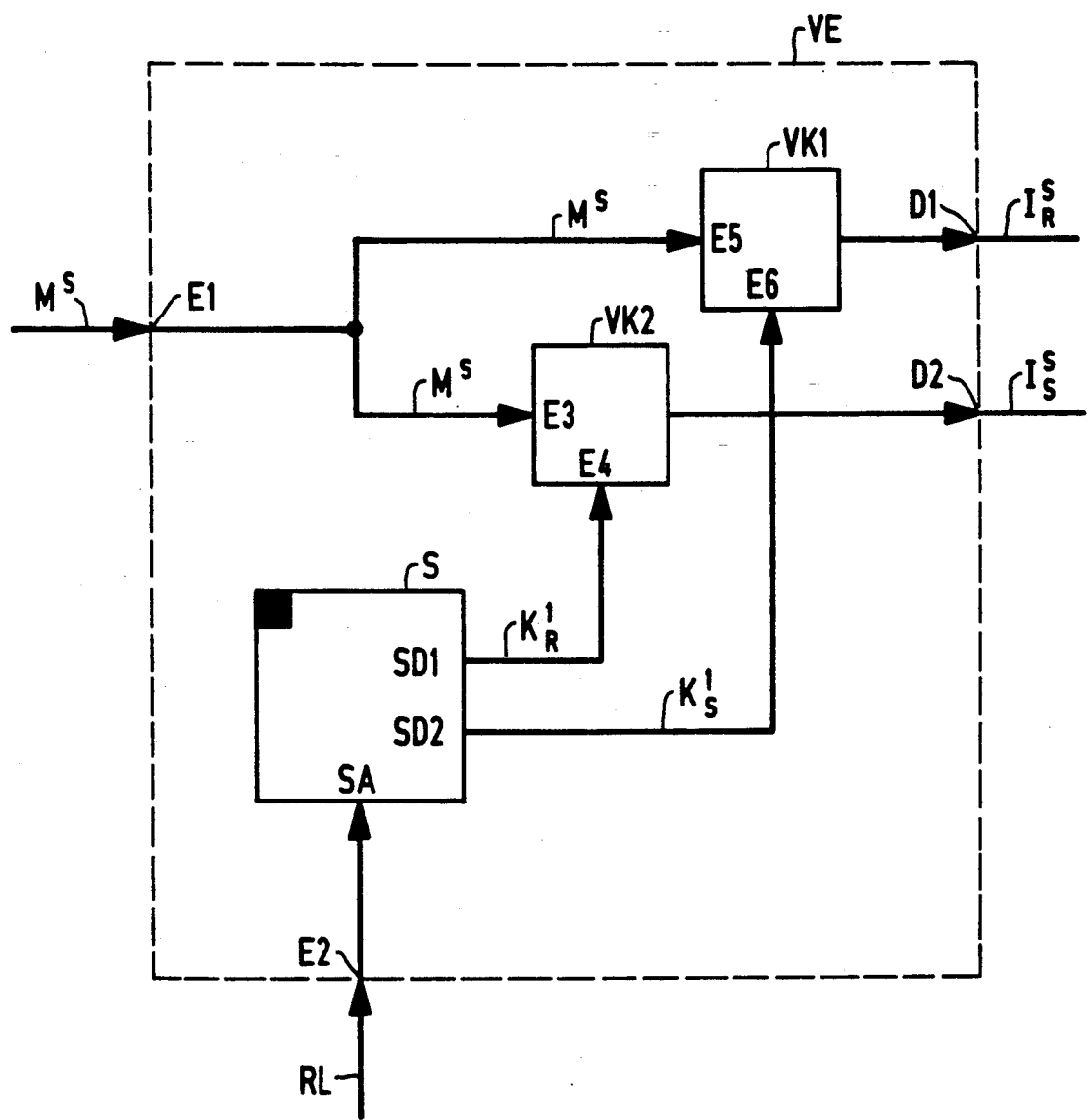
FIG. 1 is a block diagram of a linkage unit for the formation of nominal current values, constructed according to an embodiment of the invention.

Referring to FIG. 1, a block diagram of a linkage unit VE for the formation of nominal current values $I_R{}^S$, $I_S{}^S$ is shown. The linkage unit VE has two inputs E1 and E2. A torque-regulating variable $M^s$ is applied at input E1, and a rotor-position signal RL is applied at input E2. The torque-regulating variable $M^s$ is coupled to the inputs E3 and E5 of linkers VK1 and VK2. The rotor-position signal RL is coupled to the address input SA of a memory S. The memory S is identified by a solid black square in the upper left corner.

The corresponding memory locations of memory S are addressed via the rotor-position signal RL. The particular rotor-position dependent signals $K_R{}^1$, $K_S{}^1$ are applied to the data outputs SD1, SD2 of memory S. The size of the memory S to be used depends on the number of rotor-position dependent signals $K_R{}^1$, $K_S{}^1$ and these depend on the resolution capacity of the rotor-position sensor. If, for example, the rotor-position signal RL is changed with degree of angle of the rotor, and two rotor-position dependent signals $K_R{}^1$, $K_S{}^1$ are to be triggered per rotor-position signal, then the memory S would need to have more than 720 memory locations. The superscripted numbers $K_R{}^1$, $K_S{}^1$ identify the rotor-position dependent signal for the particular angle.

The rotor-position dependent signals $K_R{}^1$, $K_S{}^1$ coupled to the inputs E4 and E6 of the linkers VK1 and VK2. In the linkers VK1 and VK2 the torque-regulating variable $M^s$ is combined with the rotor-position dependent signals $K_R{}^1$ and $K_S{}^1$ respectively. As a result, the nominal current values $I_R{}^S$ and $I_R{}^S$ are applied to the data outputs D1 and D2 respectively of the linkage unit VE.

It may be assumed that the combination that takes place is a multiplication of values. Depending on whether or not the torque-regulating variable $M^s$ and/or the rotor-position dependent signals $K_R{}^1$, $K_S{}^1$ are present in analog or digital form, the multiplication can be carried out digitally or in analog form. If the torque-regulating variable $M^s$ is in analog form and the rotor-position dependent constants $K_R{}^1$, $K_S{}^1$ are present in digital form, an analog/digital multiplier can be used. If the nominal current values $I_R{}^S$, $I_S{}^S$ are to be in analog form at the data outputs D1, D2 of the linkage unit VE, multiplying digital/analog converters can be used. These digital/analog converters can also multiplicatively combine other digital and analog values present at their inputs.

The linkage unit VE is not bound to the combination of one memory S and two linkers VK1 and VK2. The linkage unit VE could also be a module within an operating program of a control system. It could also be implemented as a single memory circuit package. In this memory circuit package, addressing is carried out with the torque-regulating variable $M^s$ and with the rotor-position signal RL in digital form. The predetermined nominal current values $I_R{}^S$, $I_S{}^S$ for each phase to be regulated are stored in memory locations in the circuit package.

Figure 2:
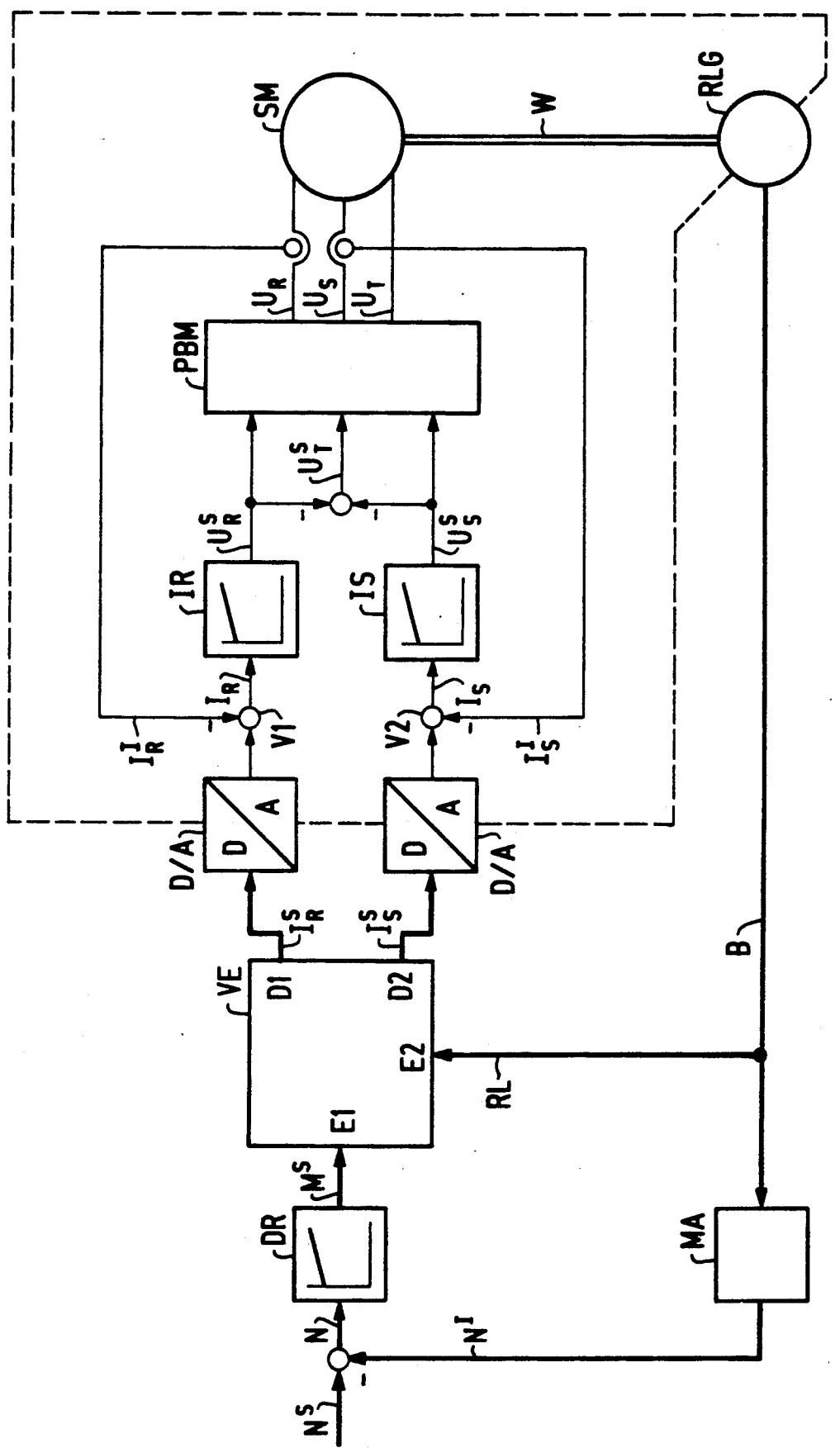
FIG. 2 and FIG. 3 are block diagrams for the regulation of a synchronous motor constructed according to an embodiment of the invention.

Referring to FIG. 2, a block diagram for the regulation of a synchronous motor SM is shown. The signal flow between the individual blocks is symbolized by lines with arrows. The thicker lines represent bus systems. The number of lines used per data bus B can be adapted according to the digital circuit packages being used or the desired measuring and regulating accuracy.

The entire regulating circuit comprises a speed regulator DR, the linkage unit VE, two digital-to-analog converters D/A, two current regulators IR and IS, a pulse width modulator PBM, the synchronous motor SM, and a rotor-position sensor RLG which is coupled via a shaft W with the rotor of the synchronous motor SM. The rotor-position sensor RLG is also coupled to a measuring value processor MA.

The speed regulator DR as well as the current regulators IR and IS are identified in embodiment by their transfer function as a PI (proportional integral) regulator.

The analog portion of the circuit is enclosed by a dashed rectangle. The analog portion begins at the analog outputs A of the digital-to-analog converters D/A. It is left to the user as to which point of the regulating circuit the change over to analog signal processing is made. A more extensive digital signal processing is possible with the advanced means available today.

The linkage unit VE has two inputs E1 and E2. It may be assumed that the linkage unit is implemented as a single memory, as described above. Each adjustable combination of nominal current values $I_R{}^S$ and $I_S{}^S$ is stored in the same address location in memory. A particular address for a memory location is a combination of the signals which are present at inputs E1 and E2. The number of signals present at input E2 depends on the resolution of the rotor-position sensor RLG. Likewise, the number of signals present at input E1 depends on the width of a digital word (i.e., the number of logic "0" signals or logic "1" signals per value) at the output of the speed regulator DR. The size of a particular memory location for a nominal current value $I_R{}^S$, $I_S{}^S$ can be adapted to the desired measuring or regulating accuracy. The digital-to-analog converters D/A must be designed according to this accuracy.

For the control of multiphase synchronous machines, where more than two nominal current values $I_R{}^S$, $I_S{}^S$ are needed, the linkage unit VE must have another memory location with the same address E1 and E2 for each additional nominal current value.

For the control of the synchronous motor SM a nominal speed $N^s$ is applied to the regulating circuit. The difference between the nominal speed $N^s$ and the actual speed $N^I$ of the synchronous machine is applied to the speed regulator DR as a speed-regulating variable N. The speed regulator DR, which is implemented as a PI controller, supplies a speed-regulating variable $M^s$ through its output to the input E2 of memory S. Simultaneously, the digital information on the rotor-position RL of the synchronous machine SM from the rotor-position sensor RLG of the synchronous machine is applied at the input E2 of the linkage unit VE. The combination of the signals applied at the inputs E1 and E2 of the linkage unit VE addresses two memory cells in the linkage unit VE where the nominal current values $I_R{}^S$ for the phase R and $I_S{}^S$ for the phase S are stored as digital signals.

These nominal current values $I_R{}^S$, $I_S{}^S$ correspond to the desired nominal current proportional to the nominal torque $M^s$ which is required, ideally, for achieving a constant torque. The properties resulting from the non-ideal construction of the synchronous motor SM are taken into consideration by the additional information from the rotor position RL. Depending on the position of the rotor a nominal current value $I_R{}^S$, $I_S{}^S$, which is modified by comparing it to the torque-regulating variable $M^s$, is output at the data outputs D1 and D2 of the linkage unit VE.

Therefore, the nominal current values $I_R{}^S$, $I_S{}^S$ are applied at the digital inputs D of the associated digital-to-analog converter D/A in each instance.

According to the invention, the particular nominal current value $I_R{}^S$, $I_S{}^S$ is applied as an analog nominal current value (the reference symbols $I_R{}^S$ and $I_S{}^S$ apply for the digital nominal current value as well as for the analog nominal current value) at the analog output A of the associated digital-to-analog converter D/A. The comparator V1 forms the difference between the analog nominal current value $I_R{}^S$ and the analog actual value $I_R{}^I$ which is applied as the current-regulating variable $I_R$ to the input of the current regulator IR. Also, the comparator V2 forms the difference between the analog nominal current value $I_S{}^S$ and the analog actual current value $I_S{}^I$ which is applied as the current-regulating variable $I_S$ to the input of the current regulator IS for the phase S.

By using a current regulator IR, IS for each regulated current phase in contrast to prior regulation concepts, these phase currents can be regulated individually. Therefore, the up-commutated current alternates with the down-commutated current exactly and hence no system-caused torque transients occur.

The regulated phase winding nominal voltages $U_R{}^S$ and $U_S{}^S$ are coupled to the outputs of the current regulator IR, IS, which are implemented as PI controllers. In the case of a synchronous motor SM operating in a neutral lead circuit, the sum of the three nominal phase winding voltages $U_R{}^S$, $U_T{}^S$, $U_S{}^S$ must at any moment be equal to zero. This being the case, the third nominal phase winding voltage $U_T{}^S$ can be formed from the two nominal phase winding voltages $U_R{}^S$, $U_S{}^S$ present at the output of the current regulators IR, IS. The three nominal phase winding voltages $U_R{}^S$, $U_T{}^S$, $U_S{}^S$ are then applied at the input of the pulse width modulator PBM. In the pulse width modulator PBM the pulse width modulated phase winding voltages $U_R$, $U_S$ and $U_T$ are generated from the applied nominal phase winding voltages $U_R{}^S$, $U_T{}^S$, $U_S{}^S$ which drive the synchronous machine. At the output of the pulse width modulator PBM the actual current values $I_R{}^I$ and $I_S{}^I$ in phase winding R and in phase winding S are sensed by current transformers. These actual current values $I_R{}^I$ and $I_S{}^I$ are needed for the formation of the nominal current values $I_R$ as well as $I_S$.

The synchronous machine SM is coupled via the shaft W to the rotor-position sensor RLG. The rotor-position sensor RLG can also be directly connected to the rotor of the synchronous machine SM. Depending on the desired rotation quality of the rotor of the synchronous machine, a rotor-position sensor RLG with a different resolution can be used. For example a standard RST rotor-position sensor for 1 micrometer precision or a sensor with 4096 points per rotation for 0.1 micrometer precision of position regulation can be used. With sensors having a higher number of points per rotation, the nominal current values $I_R{}^S$, $I_S{}^S$ can be adjusted in finer steps than when using standard RST rotor-position sensors. These finer steps have a positive effect on rotation.

When using a higher precision rotor-position sensor, the signals supplied by the rotor-position sensor RLG to the data bus B can be applied to the input of the measuring value processor MA as well as the input E2 of the linkage unit VE. The measuring value processor MA forms the actual speed value $N^I$ from the rotor position per time unit. The actual speed value $N^I$ and the nominal speed value $N^s$ are used for the formation of the speed-regulating variable N.

Figure 3:
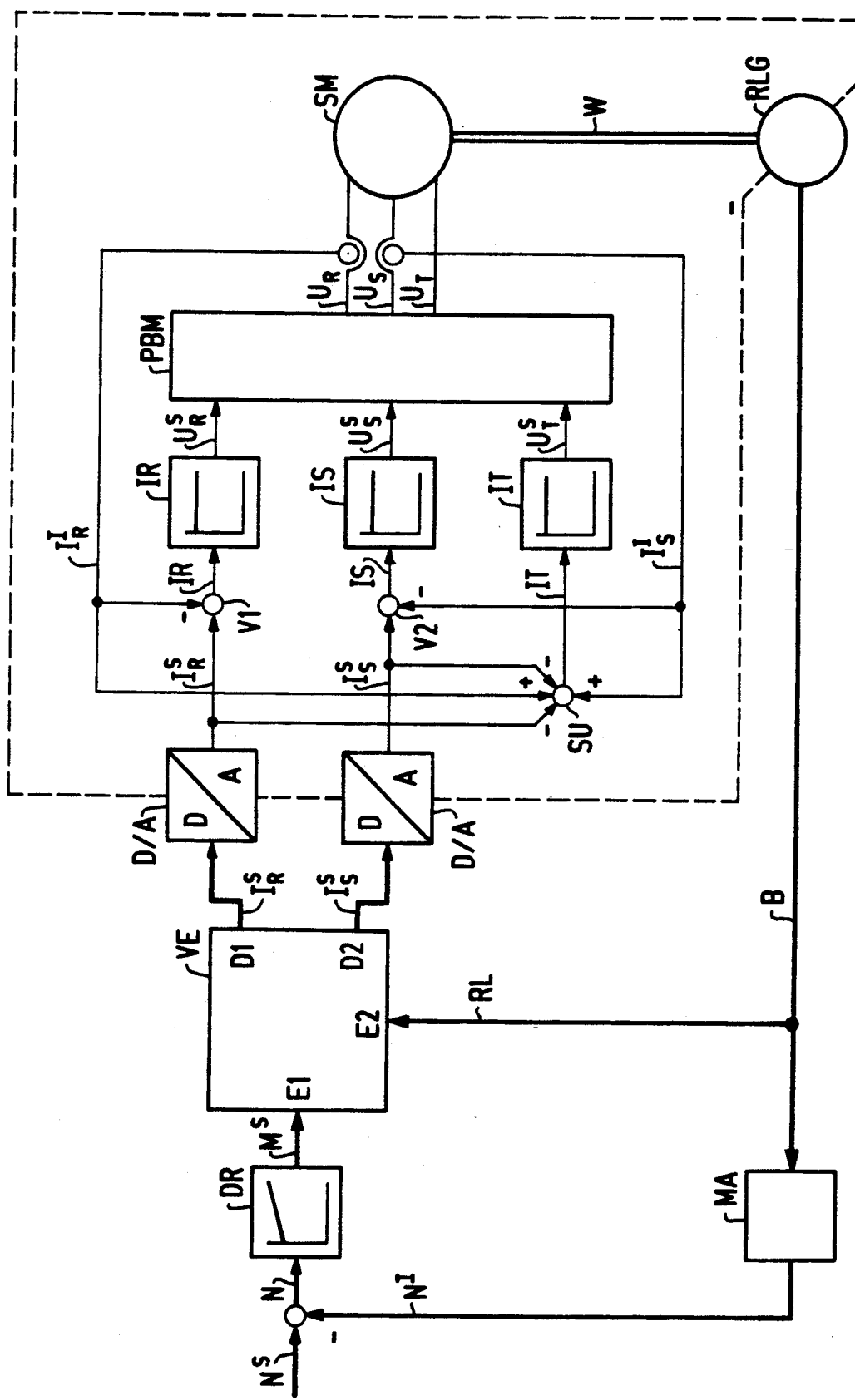

Referring to FIG. 3, a block diagram for the regulation of a synchronous machine SM is shown. The block diagram of FIG. 3 differs from that of FIG. 2 in the analog portion of the regulating circuit which is framed by a dashed line. In addition to the phase winding currents $I_R$ and $I_S$ at the output of the comparators V1 and V2, respectively, the third phase winding current $I_T$ is formed according to the neutral lead condition (sum of all currents=0). In FIG. 3, the nominal current values $I_R{}^S$ and $I_S{}^S$ are present at the output of the particular digital-to-analog converter D/A and the actual current values $I_R$ and $I_S$ are tapped at the output of the pulse width modulator PBM. The signs of the actual current values $I_R$ and $I_S$ are taken into consideration at the summer SU. The phase winding current $I_T$ is the output of the summer SU.

For each phase winding current $I_R$, $I_S$, $I_T$, a current regulator IR, IS, IT is provided which is implemented as a P (proportional) controller which compensates the electromotive force (the switching-in of the electromotive force is not shown in the illustrated embodiment). It is understood that another regulator, for example a regulator of higher order, could also be used.

The signals present at the output of the current regulators IR, IS, IT are the phase winding voltages $U_R{}^S$, $U_S{}^S$, $U_T{}^S$. The further processing of the phase winding voltages $U_R{}^S$, $U_S{}^S$, $U_T{}^S$ is the same as shown previously in the description of FIG. 2.

What is claimed is:

1. A method for regulating the torque response of a multiphase electronically commutated electric motor comprising:
   generating a torque-regulating variable;
   providing a rotor position signal;
   forming from said rotor position signal a rotor-position dependent signal for each phase to be regulated, the rotor-position dependent signals being selected to compensate for the differences between the actual torque and the ideal torque at each rotor position resulting form the manufacture of said electric motor;

combining the torque-regulating variable with each of said rotor-position dependent signals to form a nominal current value for each current phase;

forming a current-regulating value from the difference between the instantaneous nominal current value and the instantaneous actual current value; and generating a nominal voltage corresponding to said current-regulating value for each current phase and using said nominal voltages to control the electric motor using a pulse width modulator.

2. The method of claim 1, wherein said rotor-position dependent signals are additionally selected for presetting a desired nominal torque value.

3. The method of claim 2, comprising storing the rotor-position dependent signals in a memory and triggering said memory by applying said rotor position signal to the address input of said memory.

4. The method of claim 3, wherein, for the regulation of a three-phase electric motor, two phases are regulated and further including forming a nominal voltage for the third phase from the two other nominal voltages using the neutral lead condition.

5. The method of claim 3, wherein, for the regulation of a three-phase electric motor, two phases are regulated and further including forming a third current-regulating variable from the particular analog nominal current values present and from the actual current values using the neutral lead condition.

6. The method of claim 1 wherein said motor is a synchronous motor.

7. The method of claim 1, wherein, for the regulation of a three-phase electric motor, two phases are regulated and further including forming a third current-regulating variable from the particular analog nominal current values present and from the actual current values using the neutral lead condition.

8. The method of claim 2 wherein said motor is a synchronous motor.

9. The method of claim 2 wherein, for the regulation of a three-phase electric motor, two phases are regulated and further including forming a third current-regulating variable from the particular analog nominal current values present and from the actual current values using the neutral lead condition.

10. The method of claim 3 wherein said motor is a synchronous motor.

11. A method for regulating the torque response of a multiphase electronically commutated electric motor comprising:

generating a torque-regulating variable;
providing a rotor-position signal;
storing, in a memory, nominal current values corresponding to each potential value for the torque-regulating variable and each potential rotor-position value as a digital nominal current value for each phase to be regulated, said digital nominal current values being selected to compensate for the differences between the actual torque and the ideal torque at each rotor position resulting from the manufacture of said electric motor;

triggering a particular digital nominal current value for each phase to be regulated by applying the current torque-regulating variable and the current rotor position signal to the address inputs of the memory;

converting each particular digital nominal current value to an analog nominal value;

forming a current-regulating variable from the difference between said analog nominal current value and actual current value for each phase to be regulated; and generating a nominal voltage corresponding to said current-regulating variable for each current phase and using said nominal voltages to control the electric motor using a pulse width modulator.

12. The method of claim 11 wherein said motor is a synchronous motor.

13. The method of claim 11, wherein, for the regulation of a three-phase electric motor two phases are regulated and further including forming a nominal voltage for the third phase from the two other nominal voltages using the neutral lead condition.

14. The method of claim 13 wherein said motor is a synchronous motor.

15. The method of claim 11, wherein, for the regulation of a three-phase electric motor, two phases are regulated and further including forming a third current-regulating variable from the particular analog nominal current values present and from the actual current values using the neutral lead condition.

16. The method of claim 15 wherein said motor is a synchronous motor.

17. The method of claim 11, wherein, for the regulation of a three-phase electric motor, two phases are regulated and further including forming a third current-regulating variable from the particular analog nominal current values present and from the actual current values using the neutral lead condition.

18. The method of claim 17 wherein said motor is a synchronous motor.

19. The method of claim 13, wherein, for the regulation of a three-phase electric motor, two phases are regulated and further including forming a third current-regulating variable from the particular analog nominal current values present and from the actual current values using the neutral lead condition.

20. The method of claim 15, wherein, for the regulation of a three-phase electric motor, two phases are regulated and further including forming a third current-regulating variable from the particular analog nominal current values present and from the actual current values using the neutral lead condition.

21. The method of claim 11, wherein said digital nominal current values are additionally selected for presetting a desired nominal torque value.

* * * * *

UNITED STATES PATENT AND TRADEMARK OFFICE
CERTIFICATE OF CORRECTION

PATENT NO. : 5,184,056

DATED : February 2, 1993

INVENTOR(S) : Richard Brune, et al

It is certified that error appears in the above-identified patent and that said Letters Patent is hereby corrected as shown below:

Column 1, line 37, Change "No. P 37 36 215.5" to --No. P 37 36 213--.

Signed and Sealed this

Thirtieth Day of November, 1993

Attest:

BRUCE LEHMAN

Attesting Officer

Commissioner of Patents and Trademarks